United States Patent [19]

Braxell

[11] 4,373,829
[45] Feb. 15, 1983

[54] DEVICE FOR THE JOINING OF COMPONENTS

[76] Inventor: Nils Braxell, Kapplandsgatan 96, S-414 78 Göteborg, Sweden

[21] Appl. No.: 198,944
[22] PCT Filed: Nov. 13, 1979
[86] PCT No.: PCT/SE79/00231
  § 371 Date: Jul. 13, 1980
  § 102(e) Date: Jul. 11, 1980
[87] PCT Pub. No.: WO80/00993
  PCT Pub. Date: May 15, 1980

[30] Foreign Application Priority Data

Nov. 13, 1978 [SE] Sweden ............... 7811676

[51] Int. Cl.³ ............................................. F16B 12/04
[52] U.S. Cl. ....................................... 403/267; 403/292; 403/266
[58] Field of Search ................ 403/292, 266, 267, 265

[56] References Cited

U.S. PATENT DOCUMENTS 3,140,967  7/1964  Kaufmann et al. ............. 403/267 X
3,756,635  9/1973  Beers ............................. 403/292 X

FOREIGN PATENT DOCUMENTS 2018791  10/1971  Fed. Rep. of Germany ...... 403/265
2158412   5/1973  Fed. Rep. of Germany .
2546110   4/1977  Fed. Rep. of Germany .
2705484   8/1978  Fed. Rep. of Germany ...... 403/267
2341057   9/1977  France .
 138914   8/1978  Norway .
 153730   3/1956  Sweden ........................... 403/265

Primary Examiner—Andrew V. Kundrat

[57] ABSTRACT

Device for the joining of components, by way of example furniture components, which device comprises at least one connecting piece (19), which in mounted position of the components (15, 16) is attached to the components by means of a glue joint, so that they are held together. The glue for the glue joint is supplied by the connecting piece (19, 23) having a portion with double walls, between which a quantity of glue (21) is placed, the cross-section of said connecting piece across said portion being larger than the mounting space (17, 18), into which the connecting piece shall be inserted, so that during the assembling the double walls are pressed against each other and squeeze out the glue onto the outer surfaces of the connecting piece through openings provided in the walls.

4 Claims, 5 Drawing Figures

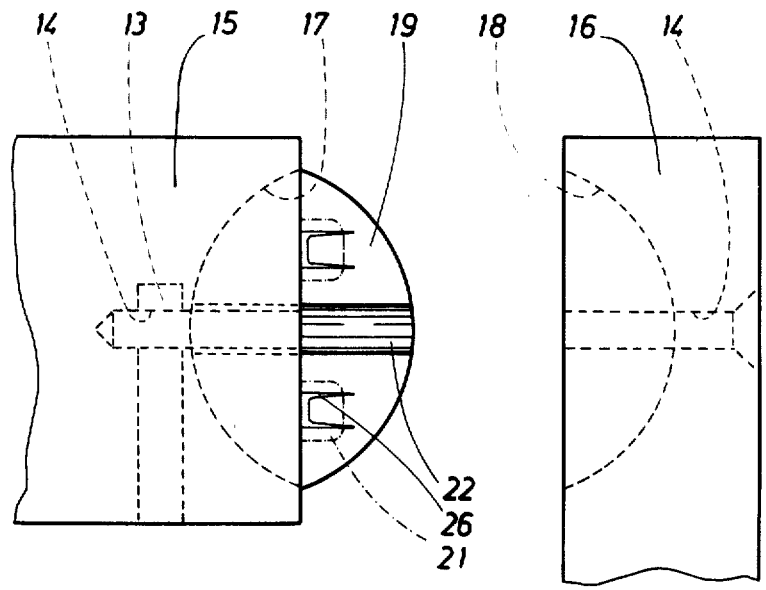
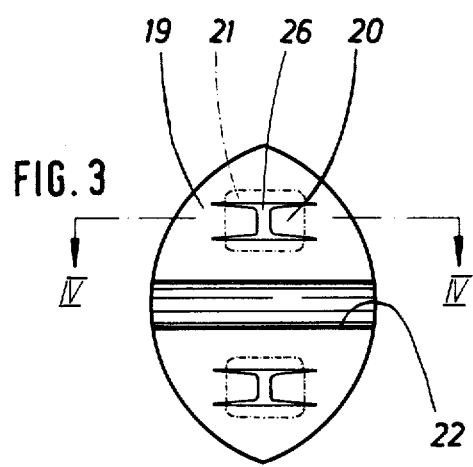
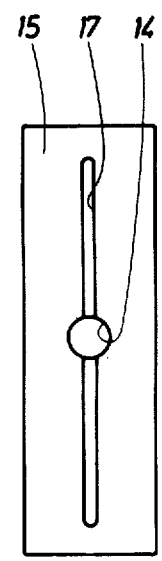

DEVICE FOR THE JOINING OF COMPONENTS

TECHNICAL FIELD

The present invention relates to a device for the joining of components, by way of example furniture components, which device comprises at least one connecting piece, which in mounted position of the components is attached to said components in such a way that they are held together. The connecting piece has surfaces, which are adapted to be attached to at least one of the components by means of a glue joint, the glue for the glue joint being supplied by at least one body, which in an initial state encloses at least one not directly accessible quantity of glue, which by mechanically influencing the body at the mounting of the connecting piece in the component or components, is transformed to an adhesive active phase.

BACKGROUND

Especially when assembling of wooden components, as is the case with furniture delivered in the form of a kit to be assembled by the retailer or the customer, a method of assembly has to be used, which is very simple, and the traditional glueing is therefore out of the question. In known mounting methods, which are available for this and the like purposes, screws and similar are used, which especially in wooden components due to the shrinkage of the material requires a subsequent tightening up.

A device for the simplified glueing together of parts to be connected with each other is for example known from the Norwegian patent publication No. 138,914. In the initial state of the quantities of glue they are enclosed in receptacles of a material easy to tear. During assembling the receptacles are torn and the glue is made to flow out between the components, which are going to be joined.

However, the system is relatively complicated in use involving the handling of several components, which can easily get lost or which can be forgotten in connection with the mounting. The system therefore lends itself to professional use only.

Technical problem:

The problem which shall be solved by means of the present invention constitutes the provision of a device for the joining of components of the kind, which has been described above, and which in the condition of use comprises a unit, of which the mass of glue is an integrated part in such a manner that several components need not be handled. In spite thereof such a supply and such a spreading of the glue shall be obtained that a reliable glue joint is obtained.

The solution:

The problem in question is solved by providing the connecting piece, which constitutes the body, with a portion with double walls, between which the quantity of glue is placed, the cross-section of the connecting piece across said portion being larger than the mounting space, in which the connecting piece shall be introduced when assembling the components in question, so that during the assembling operation the double walls are pressed against each other squeezing out the glue onto the outer surfaces of the connecting piece through openings provided in the walls.

Advantages:

By means of the invention a device for the joining of components is obtained, which is very simple to use and in which only one unit at each point of attachment is necessary.

BRIEF DESCRIPTION OF DRAWINGS

Two embodiments of the invention are illustrated in the accompanying drawings, in which FIG. 1 is a side elevational view of two furniture components in an assembled condition, FIG. 2 is a front view of one of the furniture components, FIG. 3 is a view of the device according to the first embodiment.

BEST MODE OF CARRYING OUT THE INVENTION

Figure 4:
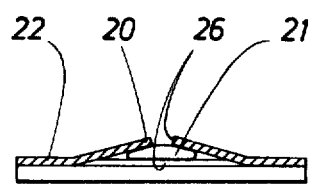
FIG. 4 is a cross-sectional view of the embodiment along the line IV—IV in FIG. 3.

It is a fundamental idea of the invention that the components are held together by means of a connecting piece, which is glued to the components and thereby obtains a permanent connection with them and in that way holds them together. However, in order to make possible that the glueing can be carried out under the non-professional conditions mentioned, the device has got a certain shape according to the invention, which will make the intended glueing possible without any handling of glue in bulk being necessary.

This is made possible by the glue in a non-active form being applied to the connecting piece, which is thus provided with a complete supply of glue. However, in connection with the mounting of the connecting piece the glue is activated and spread over the surfaces, so that the glue joint is obtained.

It is assumed that the components during the mounting operation are held together for example by means of screw elements while the glue is made to solidify. By this arrangement the mounting work takes place substantially with the same operational technique applied in joining together components, which can be connected with each other by means of screws. However, after the glue has solidified, the joint will be permanent, and even if the screw joint should get loose, this will not have any effect with respect to the stability of the joint, as this stability is maintained by the glue joint.

The device according to the invention is based on the basic principle that the connecting piece is made to engage the two components when performing the mounting operation. The connecting piece can alternatively be pre-mounted to one of the components, and then only its engagement to the second component is required during the mounting work. To this effect the connecting piece according to the invention is pre-treated with a glueing compound, which is inactivated in such a way that it does not stick or can be wiped off before the mounting, but which glueing compound is activated in connection with the mounting in such a way that it secures the connecting piece to the two components and to the second component respectively in connection with the mounting operation.

In connection with a mono-component glue, which dries in the air, the inactivation can take place by a quantity of glue applied to the connecting piece being provided with a surface layer, which is broken up during the mounting work. The surface layer can suitably be made in the form of a capsule of a thin material, by way of example a metal or a plastic foil. It is then possible to let the glue itself directly form the surface layer, inasmuch as one applies a relatively thick string of the same and lets its surface dry. With a suitable composition of the glue a sealing envelope can thereby be formed by the glue itself, which maintains the core portion in spreadable condition.

The casing of the glue can also be used for glues which properly speaking are not mono-component glues but cure by means of an added curing compound, but which glues are of the type in which no specially prepared curing compound is used. Thus, there are glues of the curing type available, where the curing process is started by the humidity of the air or by the presence of metallic ions. The glue itself can then be enclosed in a casing, which is broken up in connection with the mounting work, so that the glue either will come in contact with the humidity of the air (the components can possibly be moistened) or else is a glue of the type, which cures, when it come in contact with metallic parts, which may then occur either on the connecting piece or on the components intended for assembly.

In glues with two components with a specially prepared curing compound the glue can be applied to the connecting piece and the curing compound to the components, which results in the curing process occurring only, when the mounting operation takes place and the connecting piece and the components are assembled. Also in this case a casing can be used.

It is also possible to manufacture the glues as a two-component glue for curing, in which the mass of glue is of relatively solid consistency and does not stick, and in which the curing compound is mixed into the mass of glue in the form of small capsules, which are crushed between the connecting piece and the components.

In FIG. 1 two components are illustrated, viz. a wooden furniture frame 15, which is also shown in FIG. 2, and a furniture leg 16 of wood, which shall be mounted together. Each of the two components is provided with a groove 17, 18 respectively and a hole 14 traversing the same and also a nut 13 in the form of a rod extending in transversal direction to the hole. The components are mounted together by means of a screw, which can be inserted into the hole 14 and be screwed into the nut 13. A connecting piece 19 shall be inserted into the grooves, and a recess 22 made in the piece then will leave space for the screw.

During the mounting operation, when the connecting piece 19 is pushed into the grooves 17, 18 glue will be spread over the surface between the connecting piece and the walls of the groove. Depending upon the form of the glue string either a tearing of the foil mentioned will take place, it being assumed that said foil is so thin that what is left of it in the joint can be assumed not to influence the possibility of pressing together the components, or else joining of the components of a glue of the curing type occur, so that the curing process is started. In order to hold the components together, the screw is tightened in the nut 13. Before the glue has solidified, the screw joint then assures a sufficient strength for use. After the glue has solidified, it will act as a solid joint via the connecting piece. The setting or shrinkage, which especially occurs in wooden components, will therefore not give rise to a play in the joint, even if the screw joint should loosen its grip, as the components are held together by the glue joint via the connecting piece.

In order to facilitate the milling, the grooves 17 and 18 are made in simple milling operations by means of a side-milling cutter, due consideration being given to the space for the spindle. Thus, the grooves have the shape of circular segments. In FIG. 3 the connecting piece 19 is shown, which forms two segments of such type and, thus, fit into the grooves 17, 18 when the components 15, 16 are assembled. According to FIG. 4 which is a cross-sectional view, the connecting piece is made with folded-out flaps 20, which form a space for a string 21 of glue. When the connecting fitting 19 is pushed into its grooves, the flaps 29 will be pressed level with the connecting piece, and the string of glue will be crushed and pressed out on the surface through the holes 26 formed at the flaps. The FIGS. 3 and 4 in addition show the recess 22, which provides space for the screw.

Figure 5:
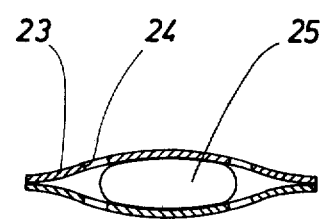
FIG. 5 is a cross-sectional view of the second embodiment.

Another embodiment is illustrated in FIG. 5. Here a connecting piece 23 is composed of two sheets with holes 24 and interconnected along their edges. The sheets to some extent bulge away from each other, so that a space for a string 25 of glue is formed. When this connecting piece 23 is pushed into a groove of a width more or less corresponding to the combined thickness of the sheet, there is no longer any space for the glue string, and therefore the material, of which this string consists, is pressed out through the holes 24 spreading over the surfaces. The glue string 25, as was the case with the glue string 21, can then be enclosed in a capsule of foil, or be in the form of a glue with two components in the manner described.

In the foregoing it has been assumed that two components are joined together by means of the device according to the invention. However, nothing prevents that several components are joined together at the same time by means of one or several connecting pieces. The connecting piece can then have an angular form or be of T-shape for its connection to several components. The connecting piece can be made of different materials, as has already been mentioned, metal being one material but also wood can be used. It can be designed as a completely separate part or a pre-mounted part or else in the form of a portion shaped as an integrated part of the components to be joined, by way of example in the form of a spring. It is not necessary that the connecting joint has the form of a string and a groove, as has been shown, but it may likewise be designed as a pin and a hole.

Industrial applicability:

It is an essential feature of the invention that the glue is applied in an inactive form, easy to handle, and in such manner that it is protected during handling before the mounting is taking place. The glue shall then be of such a kind that it is activated while being distributed over the surface to be glued. The form described has the advantage that the components can be made in conventional manner without any application of glue. Only the connecting piece has a special shape. It is easy to conceive a manufacturing method for the production of the complete connecting piece with its glueing material. The manufacturer of the components, by way of example a furniture manufacturer, thus, in his manufacturing program does not need to take into consideration that the device according to the invention shall be used, but he has only got to see to it that on delivery of the unmounted object the connecting pieces designed according to the invention will be included in the shipment. Thus, a principal form of the invention consists in components with grooves or other recesses made in conventional manner and their assembly by means of one or several connecting pieces delivered complete with a glue that can be activated.

As a supplementary information it can be mentioned that the double connecting piece according to FIG. 5 can be made of two different materials. Thus, a sheet metal plate can be provided with a layer of glue, on top of which the other layer in the form of a foil is applied. Thus, the sheet metal plate constitutes the very connecting piece. When the same is pushed into its groove the foil is pressed against the metal piece, and the mass of glue is pressed out through holes in the foil and in the sheet metal plate. It is suitable for this purpose to use a strong plastic foil or strong aluminum foil coated with plastic material. When plastic material is used, the layer of foil as a matter of fact can be welded around its edges directly to the sheet metal plate by means of the high frequency welding process. By this arrangement the connecting piece can be manufactured in a simple manner. It is also possible by means of welding to enclose the whole sheet metal plate between two strong sheets of plastic foil and apply glue to both sides of the metal plate, which glue can be pressed out through the holes of the foil. In this arrangement a conventional machine for producing a welded enclosure of objects in plastic material can be used.

By means of said plate arrangement in different variants there is free access to the air, which through the holes of the outer layer can reach the mass of glue, unless this mass, as has been said earlier, is enclosed in a foil. In order to prevent the mass of glue from solidifying, the holes can be sealed by means of an additional layer, by way of example an aluminum foil. It can also be imagined that the connecting pieces are delivered inside sealed envelopes of aluminum foil. It is known that such envelopes can be made very tight, and therefore without difficulty be maintained in a soft condition for a long time. When utilizing such a connection piece, the envelope is torn apart, and the connecting piece is taken out and applied according to specified instruction. In this case there is not any glue on the outside of the connecting piece, but it can easily be handled, and one can for example strike the edges in order to mount the connecting piece without hitting any area coated with glue. In this case the glue must have a viscous consistency, so that it does not flow out by itself through the holes.

A connecting piece in the form of such a plate can also be used in the direct joining of two surfaces, for example in connection with the mounting of brackets on a wall. The plate is then laid between the two surfaces and is pressed so much that the plate will be plane. During this operation the glue is pressed out and connects the two surfaces. In this case the plate shall be thin, and any stiffness worth mentioning is not required. Also in this case it is suitable to deliver the plate enclosed in a tight envelope.

I claim:

1. A device for connecting components to each other, comprising: at least one connecting piece, which in mounted position of the components is situated in a space formed of recesses in the components in such a manner that they are held together in a definite position, said connecting piece being formed of two thin walls connected to each other at edge-portions and curved outwardly at their center portions, so that a space is formed between said walls, and at least one opening in said walls, a quantity of glue being placed in said space, the cross-section of the connecting piece at its center portion being larger than the width of said recesses, so that during assembling the double walls are pressed against each other and the glue is pressed out through said at least one opening.

2. A device according to claim 1, in which one wall is formed of a plate and the other wall formed of folded out tongues, said at least one opening being left in said one wall when said tongues are formed.

3. A device according to claim 1, in which said connecting piece is formed of two pieces of material in sheet form provided with said at least one opening and joined together along their edges, between which pieces said quantity of glue is placed.

4. A device according to claim 2 or 3, in which the quantity of glue in un-mounted condition of the device is enclosed by a foil impeding drying of the glue, said capsule being positioned between said two walls of the connecting piece in such a way that the foil is torn apart and the glue is pressed out during pressing of the walls against each other when the connecting piece is mounted.

* * * * *